(12) United States Patent
Minoo et al.

(10) Patent No.: US 11,716,489 B2
(45) Date of Patent: Aug. 1, 2023

(54) RE-SAMPLING FILTERS FOR SCALABLE VIDEO CODING

(71) Applicant: ARRIS Enterprises LLC, Suwanee, GA (US)

(72) Inventors: Koohyar Minoo, San Diego, CA (US); David M. Baylon, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 195 days.

(21) Appl. No.: 14/304,399

(22) Filed: Jun. 13, 2014

(65) Prior Publication Data

US 2014/0369402 A1 Dec. 18, 2014

Related U.S. Application Data

(60) Provisional application No. 61/847,070, filed on Jul. 16, 2013, provisional application No. 61/835,340, filed on Jun. 14, 2013.

(51) Int. Cl.
| | |
|---|---|
| *H04N 19/80* | (2014.01) |
| *H04N 19/117* | (2014.01) |
| *H04N 19/30* | (2014.01) |
| *H04N 19/70* | (2014.01) |

(52) U.S. Cl.
CPC .......... *H04N 19/80* (2014.11); *H04N 19/117* (2014.11); *H04N 19/30* (2014.11); *H04N 19/70* (2014.11)

(58) Field of Classification Search
USPC ....................................................... 375/240
See application file for complete search history.

(56) References Cited

U.S. PATENT DOCUMENTS

| | | | |
|---|---|---|---|
| 2009/0219988 A1* | 9/2009 | Cammas ............. | H04N 19/129 375/240.01 |
| 2012/0328020 A1 | 12/2012 | Lou et al. | |
| 2014/0037015 A1* | 2/2014 | Ye ......................... | H04N 19/46 375/240.26 |
| 2015/0341661 A1* | 11/2015 | Alshina ................. | H04N 19/30 375/240.12 |

OTHER PUBLICATIONS

Alshina et al., "SHVC TEB4: Cross-check Report for Adaptive Up-Sampling Filter (Test 4.2.1)", Jan. 9, 2013; 12 JCT-VC Meeting; 103; (Joint Collaborative Team on Video Coding of ISO/IEC, JTC1/SC29/WG11 and ITU-T SG.16).*

(Continued)

*Primary Examiner* — Amir Shahnami
(74) *Attorney, Agent, or Firm* — Chernoff, Vilhauer, McClung & Stenzel, LLP (57) ABSTRACT

A layered video coding method is provided that selects data to upsamples from a base layer (BL) to provide to an enhancement (EL) to improved coding efficiency. The method determines a filter to determine an up-sampled value for a first layer for a video, wherein the filter has a set of coefficient values assigned to the filter. The up-sampled value is determined by applying the set of coefficient values to the plurality of sample values. The method then outputs the up-sampled value for use in coding a second enhancement layer (EL) of a higher resolution than the first layer. The up-sampled values may be for the $6/16$ and $-6/16$ phase offsets.

12 Claims, 8 Drawing Sheets

(56) References Cited

OTHER PUBLICATIONS

PCT Search Report & Written Opinion, RE: Application #PCT/US2014/042411; dated Sep. 8, 2014.
E. Alshina, et al., "About phase calculation and up-sampling filter coefficients in JCTVC-M0188 and JCTVC-M0322", 13th JCT-VC Meeting 104th MPEG Meeting (Joint Collaborative Team on Video Coding of ISO/IEC JTC1/SC29/WG11 and ITU-T SG.16), Apr. 17, 2013.
E. Alshina, et al., "SHVC TEB4: Cross-check report for adaptive up-sampling filter performance (test 4.2.1)", 12th JCT-VC Meeting, 103rd MPEG Meeting (Joint Collaborative Team on Video Coding of ISO/IEC JTC1/SC29/WG11 and ITU-T SG.16), Jan. 9, 2013.
L. Guo, et al., "Signaling of Phase Offset in Up-Sampling Process and Chroma Sampling Location", 13th JCT-VC Meeting, 104th MPEG Meeting (Joint Collaborative Team on Video Coding of ISO/IEC JTC1/SC29/WG11 and ITU-T SG.16), Apr. 25, 2013.
J. Zhao, et al., "Non-SCE4: Adaptive up-sampling of base layer picture using Simplified Separable bilateral filters", 13th JCT-VC Meeting, 104th MPEG Meeting (Joint Collaborative Team on Video Coding of ISO/IEC JTC1/SC29/WG11 and ITU-T SG.16), Apr. 9, 2013.
K. Minoo, et al., "On the selection of fixed filters for upsampling", 14th JCT-VC Meeting (Joint Collaborative Team on Video Coding of ISO/IEC JTC1/SC29/WG11 and ITU-T SG.16), Jul. 23, 2013.
U.S. Appl. No. 14/303,949, filed Jun. 13, 2014.
Dong J et al: "SCE1: Results of test 1.1 and 1.2 on sampling offset signaling", 14. JCT-VC Meeting; Jul. 25, 2013-Aug. 2, 2013; Vienna; (Join Collaborative Team On Video Coding of ISO/IEC JTC1/SC29/WG11 and ITU-T SG.16); URL: http://wftp3.itu.int/av-arch/jctvc-site/, No. JCTVC-N0182, Jul. 15, 2013 (Jul. 15, 2013), XP030114666.
Chen J et al: "SHVC Working Draft 2", 13.JCT-VC Meeting; Apr. 18, 2013-Apr. 26, 2013; Incheon; (Joint Collaborative Team On Viceo Coding of ISO/IEC JTC1/SC29/WG11 and ITU-T SG.16 ) No. JCTVC-M1008 Jun. 6, 2013 (Jun. 6, 2013), XP030237638.
Chen J et al: "SHVC Working Draft 2", 13. JCT-VC Meeting; Apr. 18, 2013-Apr. 26, 2013; Incheon; (Joint Collaborative Team On Video Coding of ISO/IEC JTC1/SC29/WG11 and ITU-T SG.16 ), No. JCTVC-M1008 Jun. 14, 2013 (Jun. 14, 2013), XP030237639, Retrieved from the Internet: URL:http://phenix.int-evry.fr/jct/doc_end_user/documents/13_Incheon/WG11/JCTVC-M1008-V3.zip JCTVC-M1008_v3.doc [retrieved on Jun. 14, 2013].
Chen (Qualcomm) J et al.: "High efficiency video coding (HEVC) scalable extension Draft 6", 17. JCT-VC Meeting; Mar. 27, 2014-Apr. 4, 2014; Valencia; (Joint Collaborative Team On Video Coding of ISO/IEC JTC1/SC29/WG11 and ITU-T SG. 16), No. JCTVC-Q1008 Jun. 7, 2014 (Jun. 7, 2014), XP030239944, Retrieved from the Internet: URL:http://phenix.int-evry.fr/jct/doc_end_user/documents/17_Valencia/wg11/JCTVC-Q1008-v3.zip JCTVC-Q1008_v3.docx [retrieved on Jun. 7, 2014].
Summons to Attend Oral Proceedings in European Patent Application No. 14 738 958.9-1208, dated Nov. 4, 2022.

* cited by examiner

RE-SAMPLING FILTERS FOR SCALABLE VIDEO CODING

CROSS REFERENCE TO RELATED APPLICATION

This application claims priority under 35 U.S.C. § 119(e) from earlier filed U.S. Provisional Application Ser. No. 61/835,340 filed on Jun. 14, 2013 and U.S. Provisional Application Ser. No. 61/847,070 filed on Jul. 16, 2013, both of which are incorporated herein by reference in their incorporated herein by reference in its entirety.

BACKGROUND

Technical Field

Particular embodiments generally relate to a re-sampling filter process for scalable video coding. More specifically, particular embodiments relate to up-sampling filters using video data obtained from an encoder or decoder process, where the encoder or decoder process can be MPEG-4 Advanced Video Coding (AVC) or High Efficiency Video Coding (HEVC).

Related Art

Figure 1:
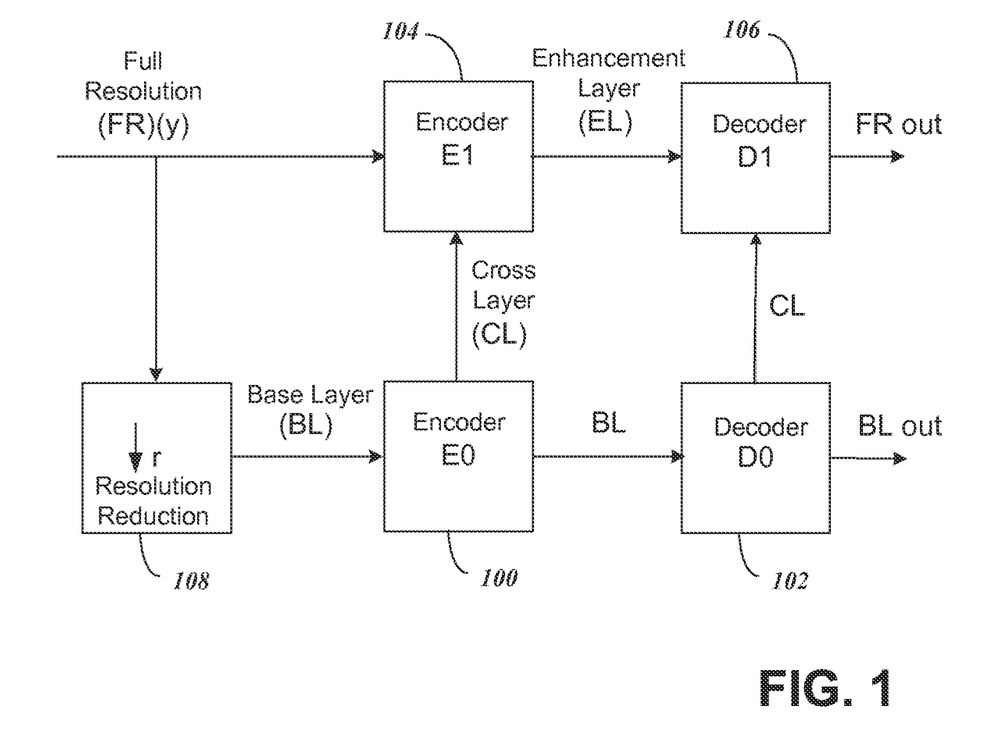
FIG. 1 is a block diagram of components in a scalable video coding system with two layers.

An example of a scalable video coding system using two layers is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the remaining layers, such as the Full Resolution (FR) layer that receives an input FR (y). The FR layer includes an encoder E1, labeled 104, and a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of coding that can use two layers shown in FIG. 1 includes video coding using AVC and the Scalable Video Coding (SVC) extension of AVC, respectively. Another example that can use two layer coding is HEVC.

FIG. 1 further shows block 108 with a down-arrow r illustrating a resolution reduction from the FR to the BL to illustrate that the BL can be created by a downsampling of the FR layer data. Although a downsampling is shown by the arrow r of block 108 FIG. 1, the BL can be independently created without the downsampling process. Overall, the down arrow of block 108 illustrates that in spatial scalability, the base layer BL is typically at a lower spatial resolution than the full resolution FR layer. For example, when r=2 and the FR resolution is 3840×2160, the corresponding BL resolution is 1920×1080.

The cross-layer CL information provided from the BL to the FR layer shown in FIG. 1 illustrates that the CL information can be used in the coding of the FR video in the EL. In one example, the CL information includes pixel information derived from the encoding and decoding process of the BL. Examples of BL encoding and decoding are AVC and HEVC. Because the BL pictures are at a different spatial resolution than the FR pictures, a BL picture needs to be up-sampled (or re-sampled) back to the FR picture resolution in order to generate a suitable prediction for the FR picture. For example, the upsampled pixel values can be used to predict corresponding FR pixel values. The up-sampled BL picture can be used in the reference picture list for prediction of the FR pictures.

Figure 2:
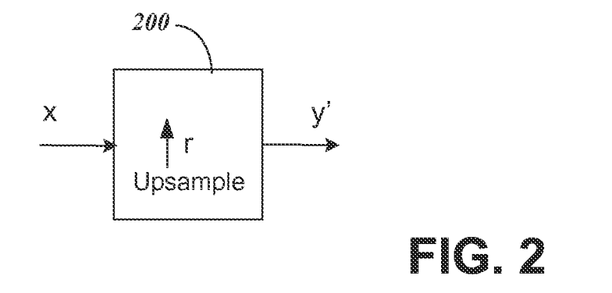
FIG. 2 illustrates an up-sampling process that can be used to convert the base layer data to the full resolution layer data for FIG. 1.

FIG. 2 illustrates an up-sampling process in block 200 of data from the BL layer to the EL. The components of the up-sampling block 200 can be included in either or both of the encoder E1 104 and the decoder D1 106 of the EL of the video coding system of FIG. 1. The BL data at resolution x that is input into up-sampling block 200 in FIG. 2 is derived from one or more of the encoding and decoding processes of the BL. A BL picture is up-sampled using the up-arrow r process of block 200 to generate the EL resolution output y' that can be used as a basis for prediction of the original FR input y.

The up-sampling block 200 works by interpolating from the BL data to recreate what is modified from the FR data. For instance, if every other pixel is dropped from the FR in block 108 to create the lower resolution BL data, the dropped pixels can be recreated using the up-sampling block 200 by interpolation or other techniques to generate the EL resolution output y' from up-sampling block 200. The data y' is then used to make encoding and decoding of the EL data more efficient.

SUMMARY

In one embodiment, a method receives a plurality of sample values. The method then determines a filter to determine an up-sampled value for a first layer for a video, wherein the filter has a set of coefficient values of [−1, 3, −9, 47, 31, −10, 4, −1] or [−1, 4, −10, 31, 47, −9, 3, −1] assigned to the filter. The up-sampled value is determined by applying the set of coefficient values of [−1, 3, −9, 47, 31, −10, 4, −1] or [−1, 4, −10, 31, 47, −9, 3, −1] to the plurality of sample values. The method then outputs the up-sampled value for use in coding a second layer of a higher resolution than the first layer. The up-sampled values may be for the 6/16 and −6/16 phase offsets.

BRIEF DESCRIPTION OF THE DRAWINGS

Further details of particular embodiments are explained with the help of the attached drawings in which.

DETAILED DESCRIPTION

As will be described in more detail below, specific sets of coefficients for filters used during an up-sampling process may provide optimal results. The up-sampling process will be generally described first and then the use of the specific coefficients.

Up-Sampling Overview

Figure 3:
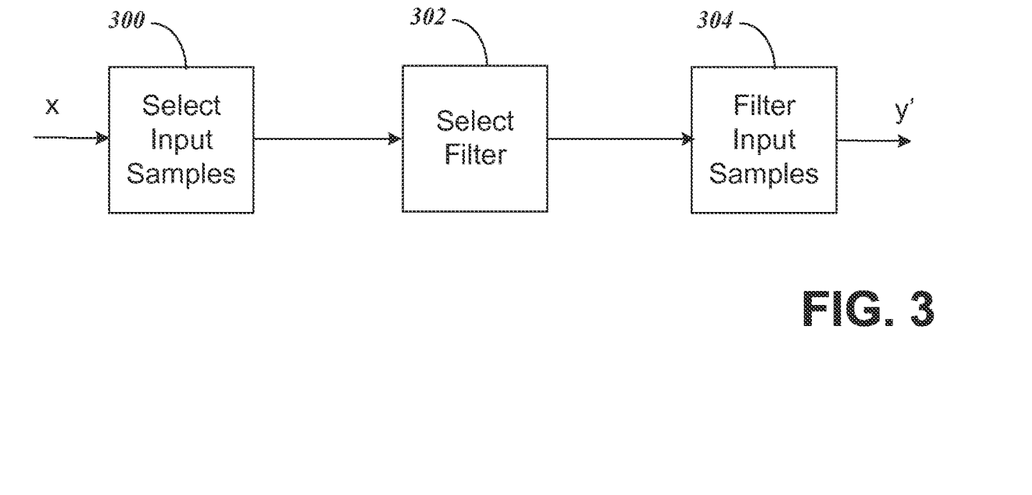
FIG. 3 shows a block diagram of components for implementing the up-sampling process of FIG. 2.

FIG. 3 shows a general block diagram for implementing an up-sampling process according to one embodiment. The up-sampling process can be used in encoding or decoding. The up-sampling or re-sampling process can be determined to minimize an error E (e.g. mean-squared error) between the up-sampled data y' and the full resolution data y. The system of FIG. 3 includes a select input samples module 300 that samples an input video signal. The system further includes a select filter module 302 to select a filter from the subsequent filter input samples module 304 to up-sample the selected input samples from module 300.

In module 300, a set of input samples in a video signal x is first selected. In general, the samples can be a two-dimensional subset of samples in x, and a two-dimensional filter can be applied to the samples. The module 302 receives the data samples in x from module 300 and identifies the position of each sample from the data it receives, enabling module 302 to select an appropriate filter to direct the samples toward a subsequent filter module 304. The filter in module 304 is selected to filter the input samples, where the selected filter is chosen or configured to have a phase corresponding to the particular output sample location desired. Also, particular embodiments select filter coefficient values that provide an optimal up-sampling result.

The filter input samples module 304 can include separate row and column filters. The selection of filters is represented herein as filters h[n; p], where the filters can be separable along each row or column, and p denotes a phase index selection for the filter. The output of the filtering process using the selected filter h[n;p] on the selected input samples produces output value y'.

Figure 4:
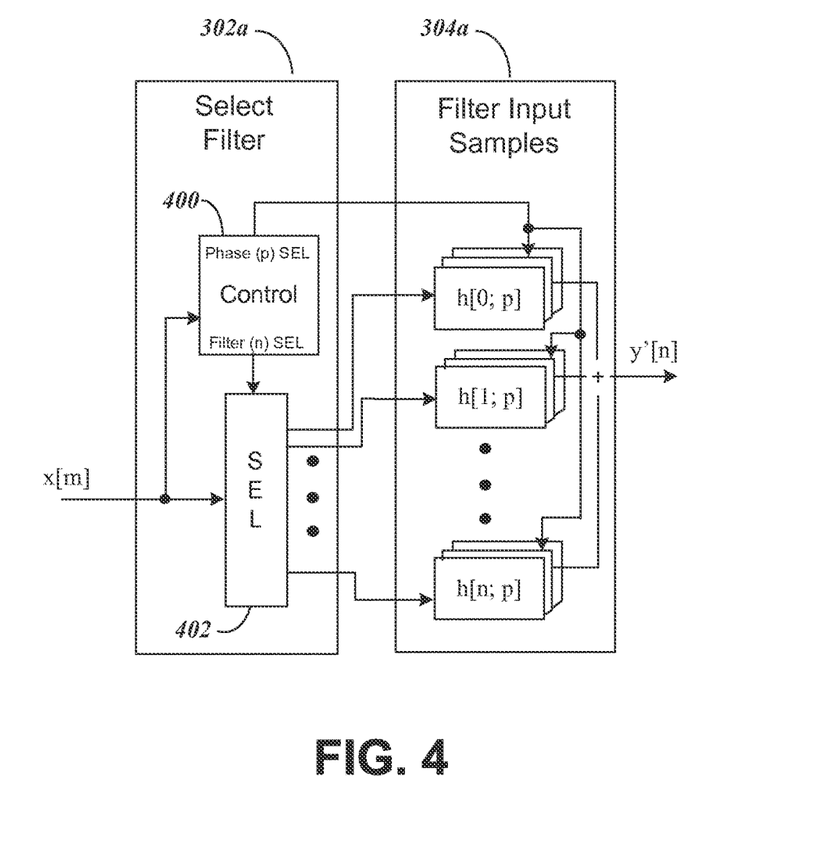
FIG. 4 shows components of the select filter module and the filters, where the filters are selected from fixed or adaptive filters to apply a desired phase shift.

FIG. 4 shows details of components for the select sample module 302 of FIG. 3 (labeled 302a in FIG. 4) and the filters module 304 of FIG. 3 (labeled 304a in FIG. 4) for a system with fixed filters. For separable filtering the input samples can be along a row or column of data. To supply a set of input samples from select input samples module 300, the select filter module 302a includes a select control 400 that identifies the input samples x[m] and provides a signal to a selector 402 that directs them through the selector 402 to a desired filter. The input samples may be from the base layer and used in the encoding process of the enhancement layer or for decoding the enhancement layer and generating the full resolution video using the enhancement layer in the decoding process. As used herein, "coding" may refer to the encoding or decoding process. The filter module 304a then includes the different filters h[n;p] that can be applied to the input samples, where the filter phase can be chosen among p phases from each row or column element depending on the output sample n desired. As shown, the selector 402 of module 302a directs the input samples to a desired column or row filter in 304a based on the "Filter (n) SEL" signal from select control 400. A separate select control 400 signal "Phase (p) SEL" selects the appropriate filter phase p for each of the row or column elements, and also the coefficient values. The filter module 304a output produces the output y'[n].

In FIG. 4, the outputs from individual filter components h[n;p] are shown added "+" to produce the output y'[n]. This illustrates that each box, e.g. h[0;p], represents one coefficient or number in a filter with phase p. Therefore, the filter with phase p is represented by all n+1 numbers in h[0,p], . . . , h[n;p]. This is the filter that is applied to the selected input samples to produce an output value y'[n], for example, y'[0]=h[0,p]*x[0]+h[1,p]*x[1]+ . . . +h[n,p]*x[n], requiring the addition function "+" as illustrated. As an alternative to adding in FIG. 4, the "+" could be replaced with a solid connection and the output y'[n] would be selected from one output of a bank of p filters representing the p phases, with the boxes h[n:p] in module 304a relabeled, for example, as h[n;0], h[n,1], . . . , h[n,p−1] and now each box would have all the filter coefficients needed to form y'[n] without the addition element required.

Although the filters h[n:p] in module 304a are shown as separate phase fixed devices, they can be implemented using a single filter with phase p selected and adaptively controlled. The adaptive phase filters can be reconfigured by software. The adaptive filters can thus be designed so that each filter h[n;p] corresponds to a desired phase p. The filter coefficients h[n;p] can be signaled in the EL from the encoder so that the decoder can reconstruct a prediction to the FR data.

Phase selection for the filters h[n:p] enables recreation of the FR layer from the BL data. For example, if the BL data is created by removing every other pixel of data from the FR, to recreate the FR data from the BL data, the removed data must be reproduced or interpolated from the BL data available. In this case, depending on whether even or odd indexed samples are removed, the appropriate filter h[n;p] with phase p can be used to interpolate the new data. The selection of p different phase filters from the filters h[n:p] allows the appropriate phase shift to be chosen to recreate the missing data depending on how the BL data is downsampled from the FR data. The selection of filter coefficient values also provides optimal up-sampling results.

Filter Coefficients

Depending on the scalability ratio and any phase offset, different phases will be chosen for the upsampling (re-sampling) operation. In one embodiment, the HEVC extension specifies 16 possible phases 0-15 with 1/16 resolution that can be used. For the luma component, phases 0 (0/16), 1 (1/16), 2 (2/16), 3 (3/16), 4 (4/16), 5 (5/16), 6 (6/16), 7 (7/16), 8 (1/2), 9 (−7/16), 10 (−6/16), 11, (−5/16), 12 (−4/16), 13 (−3/16), 14 (−2/16), and 15 (−1/16) may be used. In one embodiment, for up-sampling filtering, particular embodiments use a set of +/−1/6 phase offset filters to interpolate up-sampled values from the base layer resolution to the full resolution. In one embodiment, for 1.5× scalability, where the full resolution is in a 1.5× higher resolution than the base layer, down-sampling filtering for the base layer may introduce a 1/4 phase offset. In this case, pixels are removed from the full resolution version of the video at the 1/4 phase offset. Up-sampling filtering using a 1/6 filter set of {−1/6, 1/2, 1/6} may compensate for this phase offset. In one embodiment, the following coefficients in Table I may be used for the filters:

TABLE 1

| −1/6 | −1 | 3 | −6 | 14 | 58 | −5 | 1 | 0 |
|---|---|---|---|---|---|---|---|---|
| 1/2 | −1 | 4 | −11 | 40 | 40 | −11 | 4 | −1 |
| 1/6 | 0 | 1 | −5 | 58 | 14 | −6 | 3 | −1 |

In Table I, other coefficients for the ½ phase filter may also be used. Also, it will be understood that a phase in the ⅙ filter set may be used individually, or with other coefficients for other phases. That is, these filter coefficients do not need to be used together. The process of using the above filters will now be described.

Figure 5:
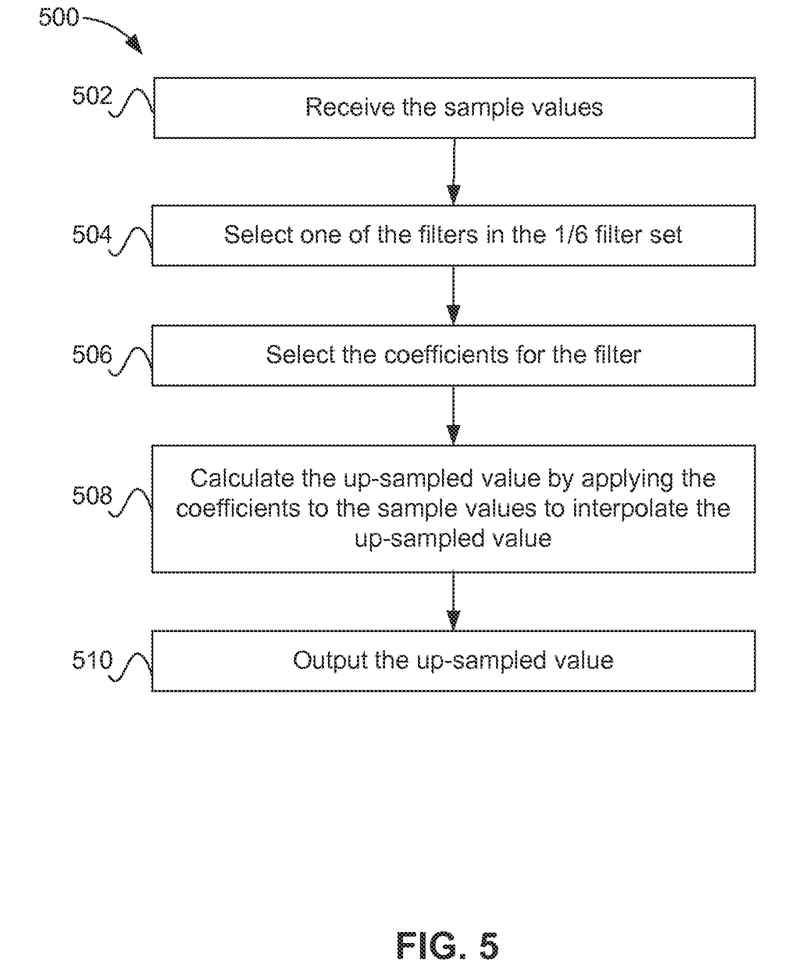
FIG. 5 depicts a simplified flowchart of a method for performing up-sampling filtering according to one embodiment.

FIG. 5 depicts a simplified flowchart 500 of a method for performing up-sampling filtering according to one embodiment. As mentioned above, up-sampling may be used to interpolate an up-sampled value from the sample values for a higher layer than a base layer in scalable video. At 502, select sample module 302a receives the sample values. For example, the sample values may be the values from the base layer, such as from a row or column of pixels.

At 504, select sample module 302a may select one of the filters in the ⅙ filter set. For example, the following process may be performed for each filter in the ⅙ filter set to generate three up-sampled values for the row or column. Once the filter is selected, at 506, select sample module 302a may select the coefficients for the filter. For example, if select sample module 302a selected the −⅙ filter, the coefficients of [−1, 3, −6, 14, 58, −5, 1, 0] are selected as the coefficients. These coefficients may be determined to yield optimal interpolation results for generating the up-sampled value from the sample values. Then, filter module 304a may assign the coefficients to the filter to weight the sample values. At 508, filter module 304a then calculates the up-sampled value for the −⅙ filter by applying the coefficients to the sample values to interpolate the up-sampled value.

At 510, filter module 304a then outputs the up-sampled value. This up-sampled value may be the value for the −⅙ position in a row or column for the luma component of the video. As discussed above, the up-sampled value may interpolate a value that was removed from the full resolution video when generating the base layer. An encoder or decoder may then use the up-sampled value in encoding or decoding corresponding video of the higher layers of the video from the base layer. For example, the up-sampled value, or a further processed up-sampled value, can be used as a basis for prediction of the higher resolution video.

Figure 6A:
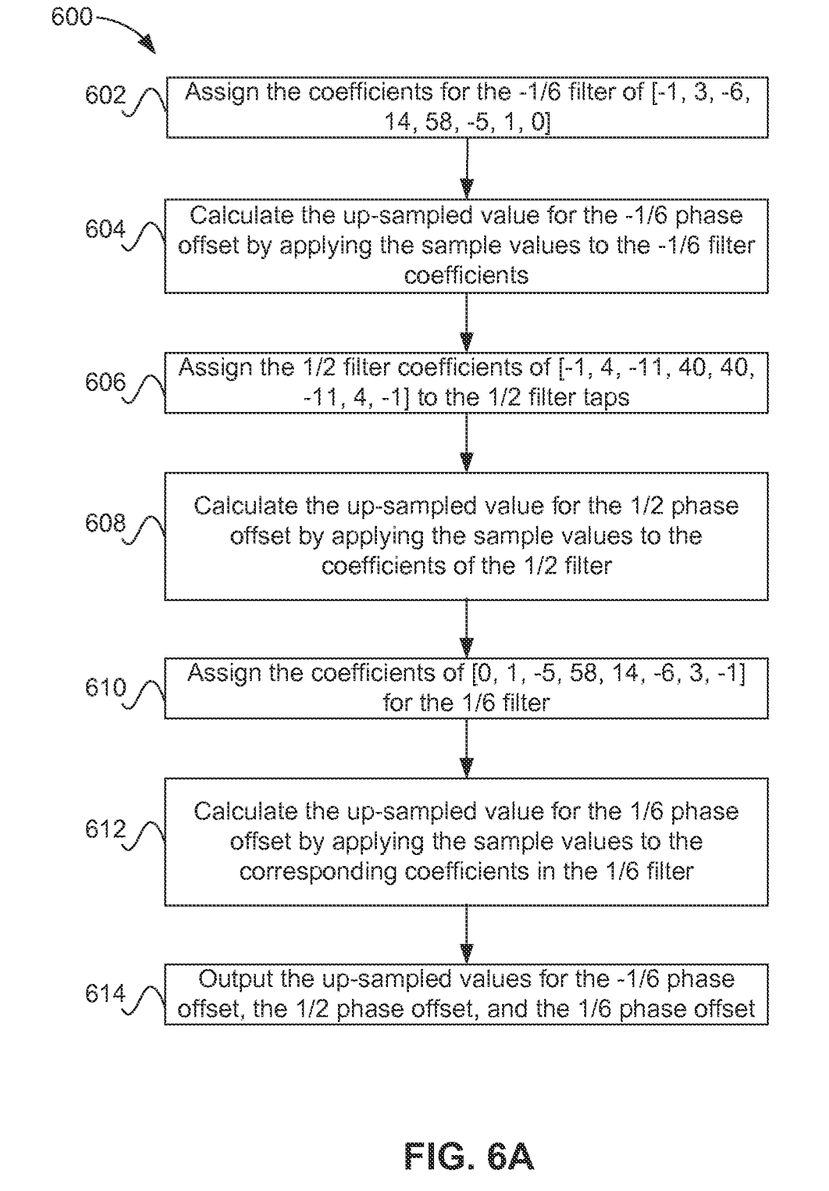
FIG. 6A depicts a more detailed flowchart of a method for performing the up-sampling for the entire −1/6 filter set according to one embodiment.

The above process may then be repeated for the ½ phase offset and the ⅙ phase offset where the up-sampled values for the ½ phase offset and the ⅙ phase offset are output. FIG. 6A depicts a more detailed flowchart 600 of a method for performing the up-sampling for the entire ⅙ filter set according to one embodiment. At 602, filter module 304a assigns the coefficients for the −⅙ filter of [−1, 3, −6, 14, 58, −5, 1, 0]. In this case, the coefficients weight corresponding sample values in corresponding taps of the −⅙ filter. For example, each coefficient may be associated with a filter tap that receives a corresponding sample value from the base layer. At 604, filter module 304a calculates the up-sampled value for the −⅙ phase offset by applying the sample values to the −⅙ filter coefficients.

At 606, filter module 304a assigns the ½ filter coefficients of [−1, 4, −11, 40, 40, −11, 4, −1] to the ½ filter taps. Also, as mentioned above, different coefficients for the ½ filter may be used. At 608, filter module 304a calculates the up-sampled value for the ½ phase offset by applying the sample values to the coefficients of the ½ filter.

At 610, filter module 304a assigns the coefficients of [0, 1, −5, 58, 14, −6, 3, −1] for the ⅙ filter. At 612, filter module 304a calculates the up-sampled value for the ⅙ phase offset by applying the sample values to the corresponding coefficients in the ⅙ filter.

At 614, filter module 304a outputs the up-sampled values for the −⅙ phase offset, the ½ phase offset, and the ⅙ phase offset. These values may then be used in the encoding or decoding process.

For example, the ⅙ phase offset position FL and the −⅙ phase offset position FR are interpolated using the values of spatial neighboring full-pel pixels, L3, L2, L1, L0, R0, R1, R2 and R3, as follows:

FL=(0*L3+1*L2−5*L1+58*L0+14*R0−6*R1+3*R2−1*R3+offset)>>shift;

FR=(−1*L3+3*L2−6*L1+14*L0+58*R0−5*R1+1*R2+0*R3+offset)>>shift.

In the above, FL is a left full resolution pixel between pixel L0 and pixel R0, and FR is a right full resolution pixel between pixel L0 and pixel R0. L1, L2, L3 are the left neighbor pixels and R1, R2, R3 are the right neighbor pixels.

Here, multiplication with filter coefficient of zero is given for the sake of completeness. However, in an implementation it is not necessary to perform the operation, and the complexity can be reduced. The phase offset is calculated by applying coefficient values to the full-pel pixel values (L3, L2, L1, L0, R0, R1, R2, and R3). For example, a full-pel pixel value is multiplied by a corresponding coefficient value. Then, the results of the multiplied values are added together. A value of "offset" is added and the result is right shifted by "shift". The values of offset and shift can be different, for example, depending on different rounding operations desired. For example, with offset=32 and shift=6, the adding of "32" and shifting to the right (6 bits) is equivalent to adding 32 and dividing by 64, which truncates the value. The resulting value can also be clipped to a range of allowable values. Other operations are also contemplated. For example, the coefficients may be applied to different full-pel pixel values (e.g., one coefficient value to multiple full-pel values or multiple coefficient values to one full-pel value, etc.) or a different truncating operation may be performed.

As an alternative to the +/−⅙ phases, an approximate +/−3/16th up-sampling phase offset may be used in place of the −⅙ and the ⅙ filters as follows:

| −3/16 | 0 | 1 | −4 | 13 | 60 | −8 | 3 | −1 |
|---|---|---|---|---|---|---|---|---|
| 3/16 | −1 | 3 | −8 | 60 | 13 | −4 | 1 | 0 |

Figure 6B:
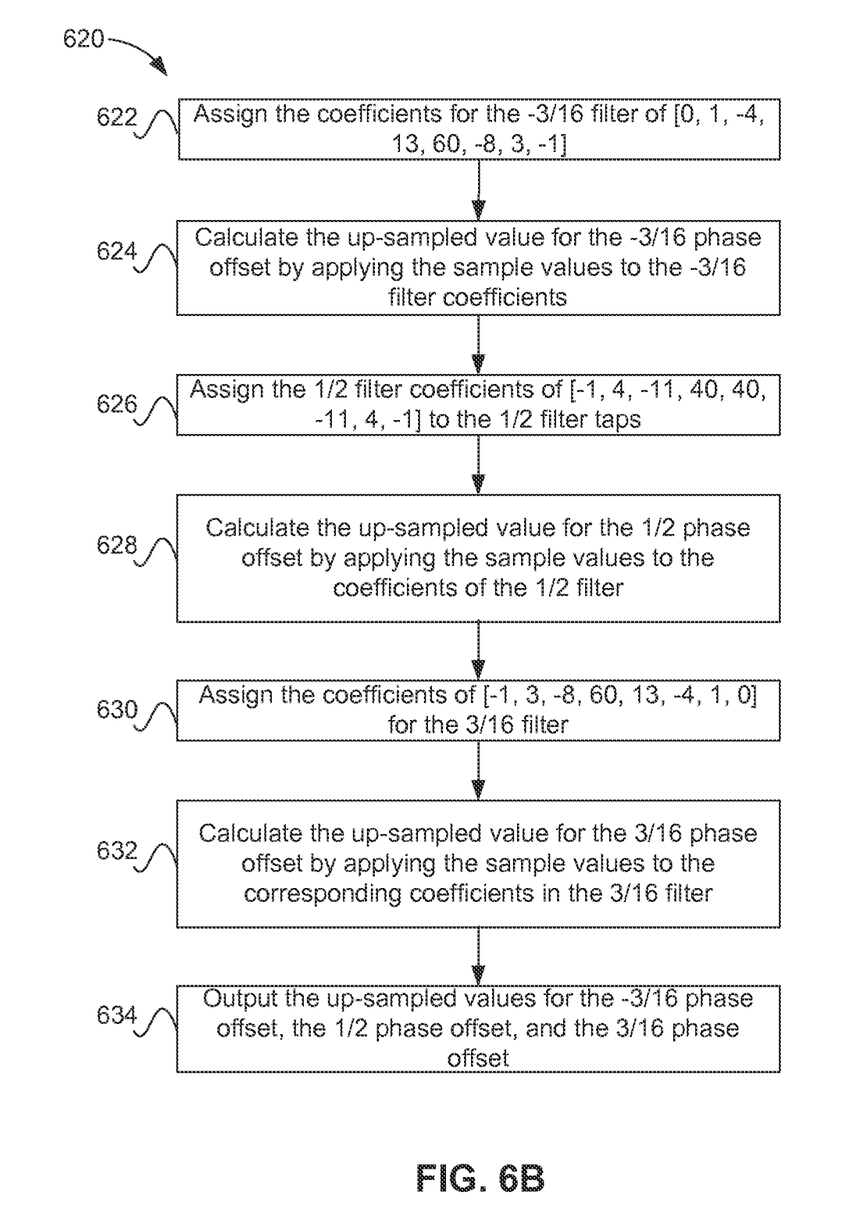
FIG. 6B depicts a more detailed flowchart of a method for performing the up-sampling for the entire 3/16 filter set according to one embodiment.

FIG. 6B depicts a more detailed flowchart 620 of a method for performing the up-sampling for the entire 3/16 filter set according to one embodiment. It will be understood that a phase in the 3/16 filter set may be used individually, or with other coefficients for other phases. That is, these filter coefficients do not need to be used together. At 622, filter module 304a assigns the coefficients for the −3/16 filter of [0, 1, −4, 13, 60, −8, 3, −1]. In this case, the coefficients weight corresponding sample values in corresponding taps of the −3/16 filter. For example, each coefficient may be associated with a filter tap that receives a corresponding sample value from the base layer. At 624, filter module 304a calculates the up-sampled value for the −3/16 phase offset by applying the sample values to the −3/16 filter coefficients.

At 626, filter module 304a assigns the ½ filter coefficients of [−1, 4, −11, 40, 40, −11, 4, −1] to the ½ filter taps. Also, as mentioned above, different coefficients for the ½ filter may be used. At 628, filter module 304a calculates the up-sampled value for the ½ phase offset by applying the sample values to the coefficients of the ½ filter.

At 630, filter module 304a assigns the coefficients of [−1, 3, −8, 60, 13, −4, 1, 0] for the ³⁄₁₆ filter. At 632, filter module 304a calculates the up-sampled value for the ³⁄₁₆ phase offset by applying the sample values to the corresponding coefficients in the ³⁄₁₆ filter.

At 634, filter module 304a outputs the up-sampled values for the −³⁄₁₆ phase offset, the ½ phase offset, and the ³⁄₁₆ phase offset. These values may then be used in the encoding or decoding process.

For example, the ³⁄₁₆ phase offsets FL (phase 3 or +³⁄₁₆) and FR (phase 13 or −³⁄₁₆) are interpolated using the values of spatial neighboring full-pel pixels, L3, L2, L1, L0, R0, R1, R2 and R3, as follows:

$$FL=(-1*L3+3*L2-8*L1+60*L0+13*R0-4*R1+1*R2+0*R3+\text{offset})>>\text{shift};$$

$$FR=(0*L3+1*L2-4*L1+13*L0+60*R0-8*R1+3*R2+-1*R3+\text{offset})>>\text{shift}.$$

As mentioned above, the above filter sets are used for luma up-sampling. Corresponding filters for chroma up-sampling for the +/−⅙ and +/−³⁄₁₆ phase offsets may be as follows:

| | | | | |
|---|---|---|---|---|
| −⅙ | −4 | 16 | 53 | −1 |
| ½ | −4 | 36 | 36 | −4 |
| ⅙ | −1 | 53 | 16 | −4 |
| −³⁄₁₆ | −4 | 17 | 53 | −2 |
| ³⁄₁₆ | −2 | 53 | 17 | −4 |

In another embodiment, different coefficient values for the +/−⁶⁄₁₆ phase offsets may be used. For example, the values for the ⁶⁄₁₆ filter coefficients may be [−1, 3, −9, 47, 31, −10, 4, −1] and the coefficient values for the −⁶⁄₁₆ phase offset may be [−1, 4, −10, 31, 47, −9, 3, −1]. Also, in one embodiment, the following coefficients may be used:
Luma:
Phase 2 {−1 3 −7 63 8 −3 1 0}
Phase 5 {−1 4 −11 54 23 −7 3 −1}
Phase 6 {−1 3 −9 47 31 −10 4 −1}
Phase 10 {−1 4 −10 31 47 −9 3 −1}
Phase 11 {−1 3 −7 23 54 −11 4 −1}
Phase 14 {0 1 −3 8 63 −7 3 −1}
Chroma:
Phase 1 {0 58 8 −2} or {−2 64 2 0}
Phase 3 {−4 58 12 −2} or {−2 53 17 −4}
Phase 5 {−4 48 24 −4}
Phase 6 {−4 44 28 −4}
Phase 7 {−6 44 30 −4}
Phase 9 {−4 30 44 −6}
Phase 10 {−4 28 44 −4}
Phase 11 {−4 24 48 −4}
Phase 13 {−2 12 58 −4} or {−4 17 53 −2}
Phase 15 {−2 8 58 0} or {0 2 64 −2}

Figure 7:
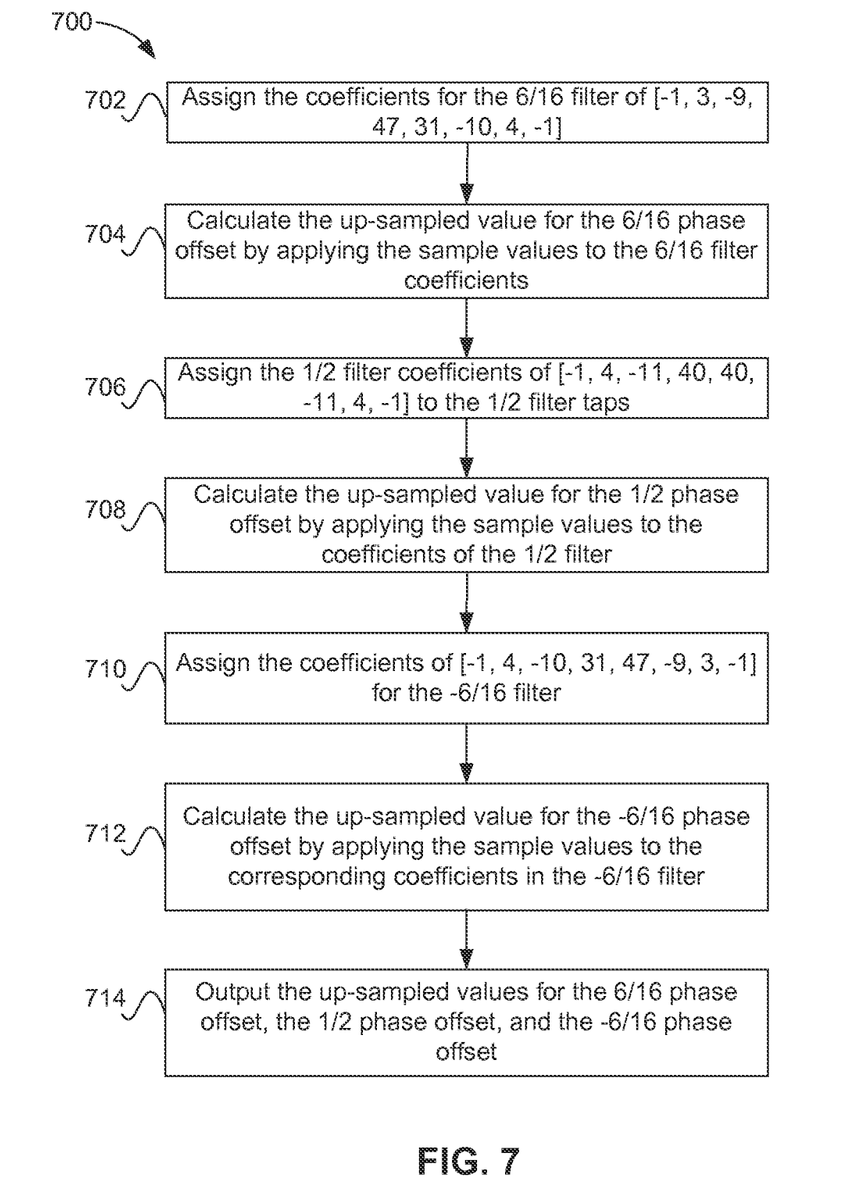
FIG. 7 depicts a more detailed flowchart of a method for performing the up-sampling for different coefficients for another 6/16 filter set according to one embodiment.

In the above, the phase 6 and phase 10 filter coefficients for the luma component correspond to the ⁶⁄₁₆ and −⁶⁄₁₆ filter coefficients. FIG. 7 depicts a more detailed flowchart 700 of a method for performing the up-sampling for different coefficients for another ⁶⁄₁₆ filter set according to one embodiment. At 702, filter module 304a assigns the coefficients for the ⁶⁄₁₆ filter of [−1, 3, −9, 47, 31, −10, 4, −1]. At 704, filter module 304a calculates the up-sampled value for the ⁶⁄₁₆ phase offset by applying the sample values to the ⁶⁄₁₆ filter coefficients.

At 706, filter module 304a assigns the ½ filter coefficients of [−1, 4, −11, 40, 40, −11, 4, −1] to the ½ filter taps. These coefficients may be the same as used above or may be different. At 708, filter module 304a calculates the up-sampled value for the ½ phase offset by applying the sample values to the coefficients of the ½ filter.

At 710, filter module 304a assigns the coefficients of [−1, 4, −10, 31, 47, −9, 3, −1] for the −⁶⁄₁₆ filter. At 712, filter module 304a calculates the up-sampled value for the −⁶⁄₁₆ phase offset by applying the sample values to the corresponding coefficients in the −⁶⁄₁₆ filter.

At 714, filter module 304a outputs the up-sampled values for the ⁶⁄₁₆ phase offset, the ½ phase offset, and the −⁶⁄₁₆ phase offset. These values may then be used in the encoding or decoding process for a higher layer.

For example, the ⁶⁄₁₆ phase offsets FL (phase 6 or +⁶⁄₁₆) and FR (phase 10 or −⁶⁄₁₆) are interpolated using the values of spatial neighboring full-pel pixels, L3, L2, L1, L0, R0, R1, R2 and R3, as follows:

$$FL=(-1*L3+3*L2-9*L1+47*L0+31*R0-10*R1+4*R2+-1*R3+\text{offset})>>\text{shift};$$

$$FR=(-1*L3+4*L2-10*L1+31*L0+47*R0-9*R1+3*R2-1*R3+\text{offset})>>\text{shift}.$$

In another embodiment, the following coefficients may be used:
Luma:
Phase 0 {0, 0, 0, 64, 0, 0, 0, 0},
Phase 1 {0, 1, −3, 63, 4, −2, 1, 0},
Phase 2 {0, 2, −6, 61, 9, −3, 1, 0},
Phase 3 {−1, 3, −8, 60, 13, −4, 1, 0},
Phase 4 {−1, 4, −10, 58, 17, −5, 1, 0},
Phase 5 {−1, 4, −11, 52, 26, −8, 3, −1},
Phase 6 {−1, 4, −11, 50, 29, −9, 3, −1},
Phase 7 {−1, 4, −11, 45, 34, −10, 4, −1},
Phase 8 {−1, 4, −11, 40, 40, −11, 4, −1},
Phase 9 {−1, 4, −10, 34, 45, −11, 4, −1},
Phase 10 {−1, 3, −9, 29, 50, −11, 4, −1},
Phase 11 {−1, 3, −8, 26, 52, −11, 4, −1},
Phase 12 {0, 1, −5, 17, 58, −10, 4, −1},
Phase 13 {0, 1, −4, 13, 60, −8, 3, −1},
Phase 14 {0, 1, −3, 9, 61, −6, 2, 0},
Phase 15 {0, 1, −2, 4, 63, −3, 1, 0}
Chroma:
Phase 0 {0, 64, 0, 0},
Phase 1 {−2, 62, 4, 0},
Phase 2 {−2, 58, 10, −2},
Phase 3 {−4, 56, 14, −2},
Phase 4 {−4, 54, 16, −2},
Phase 5 {−6, 52, 20, −2},
Phase 6 {−6, 46, 28, −4},
Phase 7 {−4, 42, 30, −4},
Phase 8 {−4, 36, 36, −4},
Phase 9 {−4, 30, 42, −4},
Phase 10 {−4, 28, 46, −6},
Phase 11 {−2, 20, 52, −6},
Phase 12 {−2, 16, 54, −4},
Phase 13 {−2, 14, 56, −4},
Phase 14 {−2, 10, 58, −2},
Phase 15 {0, 4, 62, −2}.

Coefficient Signaling

Figure 8:
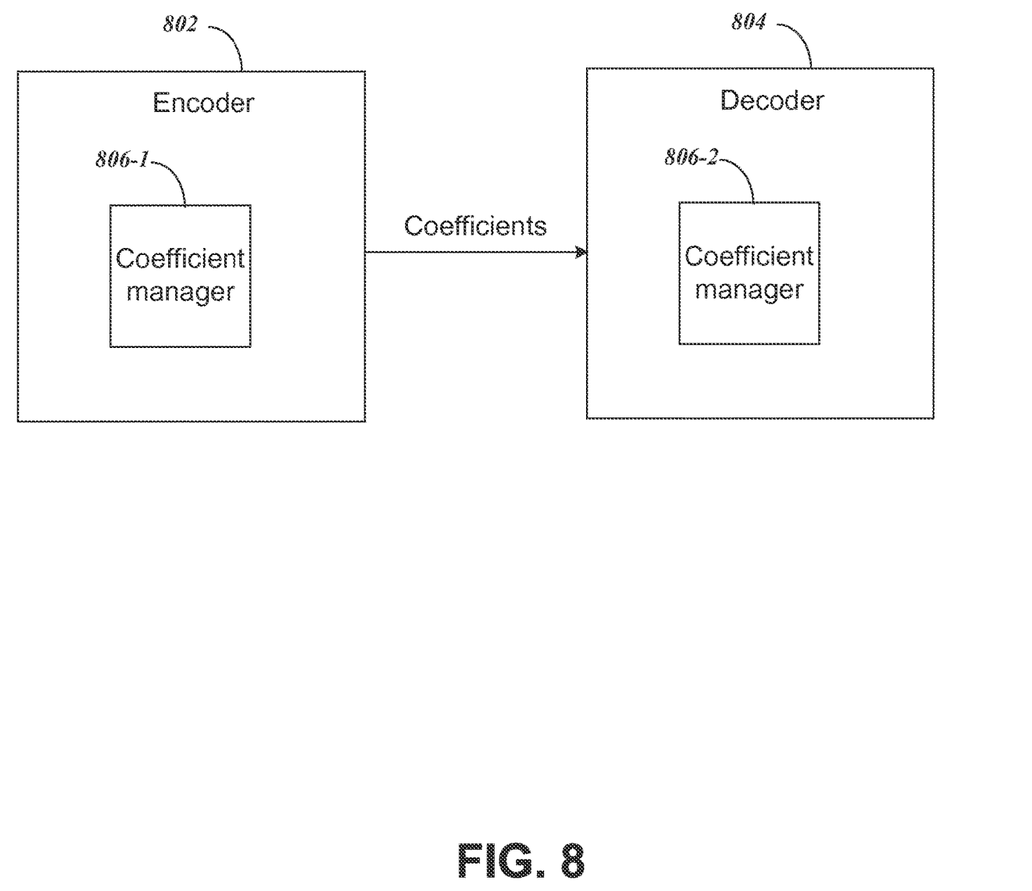
FIG. 8 depicts an example of a system for communicating which coefficients were used during the encoding process according to one embodiment.

In one embodiment, the decoder needs to know which coefficients were used in the encoder to decode the full resolution of the video. Different methods may be used to notify a decoder of the coefficients that the encoder used. FIG. 8 depicts an example of a system for communicating which coefficients were used during the encoding process according to one embodiment. An encoder 802 may be similar to encoders E1 and E0 as shown in FIG. 1. A decoder 804 may include one or more decoders (e.g., decoders D0 and D1) that can decode a base layer and other enhancement layers to provide a higher or full resolution picture.

A coefficient manager 806-1 in encoder 802 may determine how to notify decoder 804 of which coefficients are used in the encoding process. A coefficient manager 806-2 of decoder 804 may then determine the coefficients. Encoder 802 may transmit the filter coefficients explicitly. In one embodiment, encoder 802 may use different methods to notify decoder 804. For example, encoder 802 may transmit each coefficient for the ⅙ filter set to decoder 804. In another embodiment, the difference between the filter coefficients and some other reference set of filters may be explicitly transmitted. In this case, coefficient manager 806-1 may determine the difference between the ⅙ filter set coefficients and another set. For example, coefficient manager 806-1 may subtract the coefficient values for the ⅙ filter set from the values of another set. Then, encoder 802 sends the differences to decoder 804. Sending the difference may save bits. Coefficient manager 806-2 may then determine the coefficients based on the differences and the other filter.

In another embodiment, some of the filter coefficients may be time-reversed versions of other filters. For example, for the −⅙ and ⅙ filters above, the coefficients are reversed. That is, the values for the −⅙ filter are reversed for the ⅙ filter as the value for the first position of the −⅙ filter is −1 and the value for the last position of the ⅙ filter is −1, the value for the second position of the −⅙ filter is 3, and the value for the second to last position of the ⅙ filter is 3, and so on. In one embodiment, coefficient manager 806-1 may cause encoder 802 to signal a flag to indicate the time reversal.

In one example, for N filters in a set (e.g., N=3 in the ⅙ filter set), for the last N/2 filters, (N+1)/2<=i<N, encoder 802 can send a flag to indicate whether the filter coefficients are in a time-reversed version. If a flag is set for filter i, (N+1)/2<=i<N, then filter i is set to be the time-reversed version of filter N−1−i. If the flag is not set for filter i, then encoder 802 signals the filter i coefficients. Alternatively, the symmetries in the filters can be reflected in a single parent polyphase filter. By exploiting the symmetries, only the first half of the parent polyphase filter coefficients need to be signaled (including the center point for an odd-length filter), and coefficient manager 806-2 in decoder 804 can derive the remaining filter coefficients using the symmetry. Coefficient manager 806-2 may detect the flag and then determine the coefficient values based on the time reversal. In this case, encoder 802 only has to signal half (and an additional coefficient for an odd number of coefficients) of the time reversed coefficients, and then coefficient manager 806-2 can determine the other half.

Figure 9:
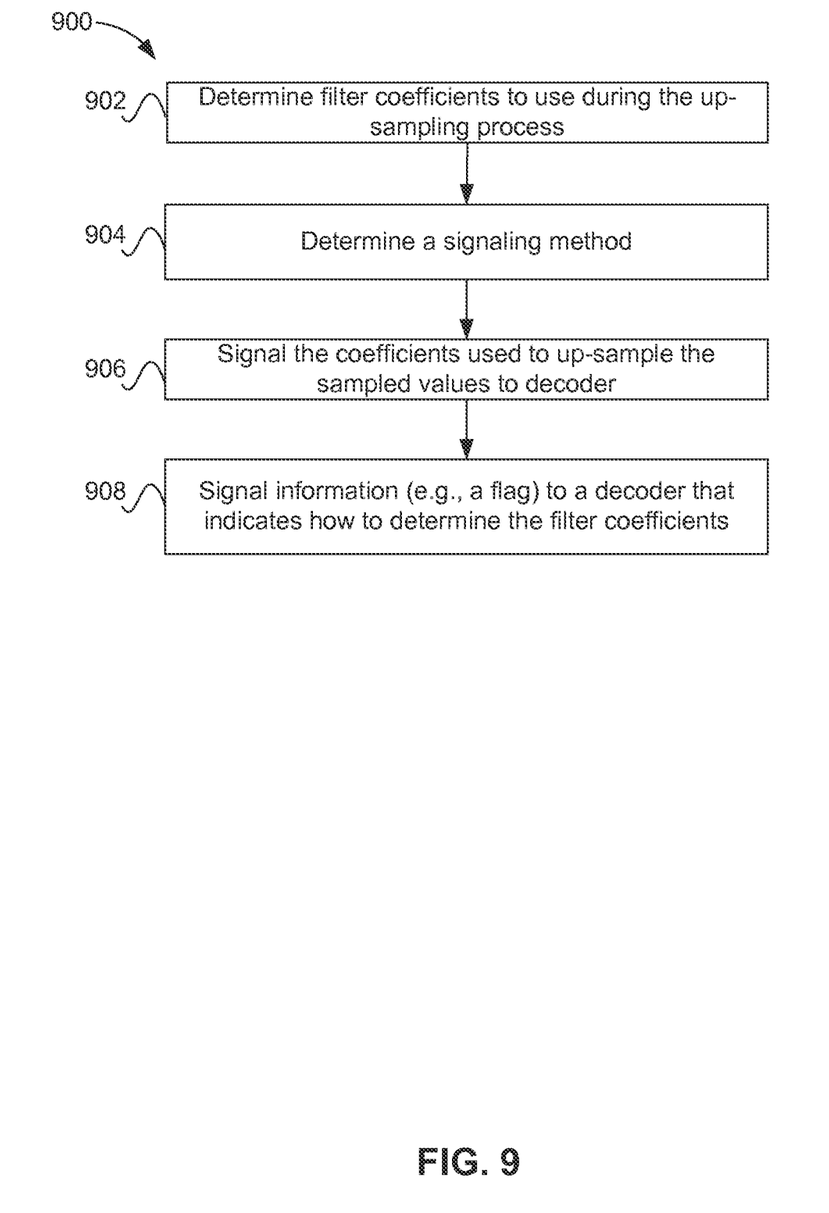
FIG. 9 depicts a simplified flowchart of a method for signaling filter coefficients according to one embodiment.

FIG. 9 depicts a simplified flowchart 900 of a method for signaling filter coefficients according to one embodiment. At 902, encoder 802 determines filter coefficients to use during the up-sampling process. For example, the coefficients for the ⅙ filter set are determined.

At 904, encoder 802 determines a signaling method. For example, encoder 802 may analyze the coefficient values to determine whether all of the coefficients need to be signaled explicitly, or only some of the coefficients need to be signaled. Also, it is possible that only a difference of the coefficients from another filter set needs to be sent. Encoder 802 may dynamically determine the signaling method or may use a pre-set signaling method for a specific filter set that is being used.

At 906, encoder 802 signals the coefficients used to up-sample the sampled values in the encoding process to decoder 804. Also, at 908, encoder 802 may signal information (e.g., a flag) to decoder 804 that indicates how to determine the filter coefficients. For example, the flag may indicate that the filter coefficients are time-reversed. Then, decoder 804 can determine the coefficient values to use.

In other embodiments, the coefficients that are used may be implicitly determined by encoder 802 and decoder 804. For example, encoder 802 and decoder 804 may analyze information in the video stream independently to determine which coefficients to use.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed:

1. A method comprising:
   determining, by a computing device, a filter to determine an up-sampled value for a first layer for a video, wherein the filter has a set of coefficient values of [−1, 3, −9, 47, 31, −10, 4, −1] assigned to the filter;
   determining, by the computing device, the up-sampled value by applying the set of coefficient values of [−1, 3, −9, 47, 31, −10, 4, −1] to the plurality of sample values;
   outputting, by the computing device, the up-sampled value for use in coding a second layer of a higher resolution than the first layer,
   wherein the filter comprises a first filter, the set of coefficient values comprise a first set of coefficient values, and the up-sampled value comprises a first up-sampled value, the method further comprising:
   determining a second filter, wherein the second filter has a second set of coefficient values of [−1, 4, −10, 31, 47, −9, 3, −1] assigned for the second filter;
   determining a second up-sampled value by applying the second set of coefficient values of [−1, 4, −10, 31, 47, −9, 3, −1] to the plurality of sample values; and
   outputting the second up-sampled value for use in coding the second layer of the higher resolution than the first layer.

2. The method of claim 1, wherein a phase offset for the first filter is a 5/16 phase offset, and wherein a phase offset for the second filter is a −5/16 phase offset.

3. The method of claim 1, further comprising:
communicating information for the set of coefficient values from an encoder to a decoder, the information allowing the decoder to determine the set of coefficient values assigned for the filter.

4. The method of claim 3, wherein communicating comprises:
communicating a first portion of the set of coefficient values from the encoder to the decoder, wherein the decoder determines a second portion of the set of coefficient values based on the first portion of the set of coefficient values.

5. The method of claim 4, wherein the set of coefficient values are time reversed.

6. The method of claim 3, wherein the information comprises a flag indicating a method to use to determine the set of coefficient values.

7. The method of claim 3, wherein the information comprises differences between the set of coefficient values and another set of coefficient values for a different filter.

8. The method of claim 1, wherein the up-sampled value is used for encoding the second layer.

9. The method of claim 1, wherein the up-sampled value is used for decoding the second layer.

10. An apparatus comprising:
one or more computer processors; and
a non-transitory computer-readable storage medium comprising instructions, that when executed, control the one or more computer processors to be configured for:
determining, by a computing device, a first filter to determine an up-sampled value for a first layer for a video, wherein the first filter has a set of coefficient values of [−1, 3, −9, 47, 31, −10, 4, −1] assigned to the first filter;
determining, by the computing device, the up-sampled value by applying the set of coefficient values of [−1, 3, −9, 47, 31, −10, 4, −1] to the plurality of sample values;
outputting, by the computing device, the up-sampled value for use in coding a second layer of a higher resolution than the first layer;
determining, by a computing device, a second filter to determine an upsampled value for the first layer for the video, wherein the second filter has a set of coefficient values of [−1, 4, −10, 31, 47, −9, 3, −1] assigned for the second filter; and
determining, by the computing device, the up-sampled value by applying the set of coefficient values of [−1, 4, −10, 31, 47, −9, 3, −1] to the plurality of sample values; and
outputting, by the computing device, the second up-sampled value for use in coding the second layer of the higher resolution than the first layer.

11. The apparatus of claim 10, wherein a phase offset for the first filter is a 5/16 phase offset, and wherein a phase offset for the second filter is a −5/16 phase offset.

12. A method comprising:
determining, by a computing device, a filter to determine an up-sampled value for a first layer for a video, wherein the filter has a set of coefficient values of [−1, 3, −9, 47, 31, −10, 4, −1] assigned to the filter;
determining, by the computing device, the up-sampled value by applying the set of coefficient values of [−1, 3, −9, 47, 31, −10, 4, −1] to the plurality of sample values; and
outputting, by the computing device, the up-sampled value for use in coding a second layer of a higher resolution than the first layer.

\* \* \* \* \*